(12) United States Patent
Nam et al.

(10) Patent No.: US 9,920,718 B2
(45) Date of Patent: Mar. 20, 2018

(54) AIR FLOW CONTROL SYSTEM OF VEHICLE

(71) Applicant: Hyundai Motor Company, Seoul (KR)

(72) Inventors: Jongwoo Nam, Seoul (KR); Hanshin Chung, Yongin-Si (KR); Joonho Lee, Seoul (KR); Hyun Cho, Seoul (KR)

(73) Assignee: Hyundai Motor Company, Seoul (KR)

( * ) Notice: Subject to any disclaimer, the term of this patent is extended or adjusted under 35 U.S.C. 154(b) by 248 days.

(21) Appl. No.: 14/557,357

(22) Filed: Dec. 1, 2014

(65) Prior Publication Data

US 2015/0345437 A1 Dec. 3, 2015

(30) Foreign Application Priority Data

May 28, 2014 (KR) .................. 10-2014-0064214

(51) Int. Cl.
*F02B 29/04* (2006.01)
*F02M 31/20* (2006.01)

(52) U.S. Cl.
CPC ......... *F02M 31/20* (2013.01); *F02B 29/0412* (2013.01); *F02B 29/0475* (2013.01); *F01P 2060/02* (2013.01); *F02B 29/0443* (2013.01); *F02B 29/0462* (2013.01); *F02B 29/0493* (2013.01); *Y02T 10/146* (2013.01)

(58) Field of Classification Search
CPC .............. F02B 29/0443; F02B 29/0475; F02B 29/0493; F02B 29/0462; F01P 2060/02
USPC ....................................................... 123/542
See application file for complete search history.

(56) References Cited

U.S. PATENT DOCUMENTS

| 1,161,444 | A | 11/1915 | Boughton |
| 1,170,730 | A | 2/1916 | Benjamin et al. |
| 1,771,714 | A | 7/1930 | Lawrence |
| 1,949,009 | A | 2/1934 | Georges |
| 2,034,587 | A | 3/1936 | Maxwell |
| 2,246,823 | A | 6/1941 | Vollberg |
| 3,210,758 | A | 10/1965 | Huston |
| 3,854,459 | A | 12/1974 | Stimeling |
| D281,273 | S | 11/1985 | Artwick |
| 4,590,889 | A | 5/1986 | Hiereth |
| 4,756,279 | A | 7/1988 | Temmesfeld |

(Continued)

FOREIGN PATENT DOCUMENTS

| GB | 2 143 025 A | 1/1985 |
| JP | 57-212321 A | 12/1982 |

(Continued)

*Primary Examiner* — Jacob Amick
*Assistant Examiner* — Charles Brauch
(74) *Attorney, Agent, or Firm* — Morgan, Lewis & Bockius LLP (57) ABSTRACT

An air flow control system of a vehicle may include an engine mixing air and fuel and generating a rotation force by combusting the mixture of the air and the fuel in a combustion chamber, main ducts provided in a front side of the vehicle to transmit air to the combustion chamber of the engine, heat dissipation members provided adjacent to the main ducts to cool a fluid flowing inside thereof through heat exchange with external air, assistant ducts branched from the main ducts to transmit air flowing in the main ducts to the heat dissipation members, and control valves provided in the assistant ducts to control air supplied to the heat dissipation members.

9 Claims, 7 Drawing Sheets

(56) References Cited

U.S. PATENT DOCUMENTS

| | | |
|---|---|---|
| 4,779,518 A | 10/1988 | Artwick |
| 4,865,816 A | 9/1989 | Walz |
| 5,060,901 A | 10/1991 | Lathrop |
| 5,344,287 A | 9/1994 | Schaefer |
| 5,758,716 A | 6/1998 | Shibata |
| 6,024,536 A | 2/2000 | Tsubakida |
| 6,192,838 B1 | 2/2001 | Matsuo et al. |
| 6,309,178 B1 | 10/2001 | Kim |
| 6,994,058 B2 | 2/2006 | Iinuma et al. |
| 7,025,086 B2 | 4/2006 | Maeda |
| D524,435 S | 7/2006 | Linn |
| 7,882,888 B1 | 2/2011 | Bugby |
| 8,197,204 B2 | 6/2012 | Aschermann |
| 8,627,911 B2 | 1/2014 | Tregnago |
| 8,922,033 B2 | 12/2014 | Vallinayagam |
| 8,936,121 B2 | 1/2015 | Vacca |
| 2004/0216863 A1 | 11/2004 | Hu |
| 2004/0226764 A1 | 11/2004 | Iwasaki |
| 2004/0261983 A1 | 12/2004 | Hu |
| 2005/0061487 A1 | 3/2005 | Kroliczek |
| 2007/0119395 A1 | 5/2007 | Nagano |
| 2007/0169725 A1 | 7/2007 | Harich |
| 2010/0006043 A1* | 1/2010 | Kardos .............. B60K 11/04 123/41.01 |
| 2010/0186934 A1 | 7/2010 | Bellenfant |
| 2011/0088671 A1* | 4/2011 | Johnson ............ F01K 23/065 123/568.12 |
| 2011/0114286 A1 | 5/2011 | Komatsu |
| 2011/0203861 A1 | 8/2011 | Charnesky |
| 2011/0219762 A1* | 9/2011 | Kobayashi ......... B60K 11/08 60/456 |
| 2011/0232865 A1 | 9/2011 | Mildner |
| 2012/0055153 A1* | 3/2012 | Murata ............. F01K 23/065 60/602 |
| 2012/0090823 A1 | 4/2012 | Labaste Mauhe |
| 2012/0227926 A1 | 9/2012 | Field |
| 2012/0263980 A1 | 10/2012 | Soukhojak |
| 2012/0291991 A1 | 11/2012 | Denkenberger |
| 2012/0318473 A1 | 12/2012 | Nishikawa |
| 2013/0284415 A1 | 10/2013 | Katoh |
| 2013/0316634 A1 | 11/2013 | Ajisaka |
| 2014/0090808 A1 | 4/2014 | Bessho |
| 2014/0366816 A1 | 12/2014 | Platt |
| 2015/0101789 A1 | 4/2015 | Enomoto et al. |
| 2015/0315955 A1 | 11/2015 | Nam |
| 2015/0330288 A1 | 11/2015 | Nam |

FOREIGN PATENT DOCUMENTS

| | | |
|---|---|---|
| JP | 2004-284514 A | 10/2004 |
| JP | 2005-170375 A | 6/2005 |
| JP | 2010-001767 A | 1/2010 |
| JP | 2010-25009 A | 2/2010 |
| JP | 4450066 B2 | 2/2010 |
| JP | 2011-126434 A | 6/2011 |
| JP | 2012-240478 A | 12/2012 |
| JP | 2012-246790 A | 12/2012 |
| KR | 20-1998-0033347 U | 9/1998 |
| KR | 10-2002-0092050 A | 12/2002 |
| KR | 10-2011-0080037 A | 7/2011 |
| KR | 10-2011-0096760 A | 8/2011 |
| KR | 10-2011-0109034 A | 10/2011 |
| KR | 20-2011-0109034 A | 10/2011 |
| KR | 10-2012-0050871 A | 5/2012 |
| KR | 10-2012-0058952 A | 6/2012 |
| KR | 10-2013-0063663 A | 6/2013 |
| KR | 10-2013-0143704 A | 12/2013 |

* cited by examiner

AIR FLOW CONTROL SYSTEM OF VEHICLE

CROSS-REFERENCE TO RELATED APPLICATION

The present application claims priority to Korean Patent Application No. 10-2014-0064214 filed May 28, 2014, the entire contents of which is incorporated herein for all purposes by this reference.

BACKGROUND OF THE INVENTION

Field of the Invention

The present invention relates to an air flow control system of a vehicle.

More particularly, the present invention relates to an air flow control system of a vehicle, controlling external air passing through a condenser, an intercooler, and a radiator from a front side of the vehicle.

Description of Related Art

In general, an air duct is a path for air, and refers to a pipe for introducing air flow to a portion where air needs to be supplied from a portion where air can be easily flown in.

For example, such an air duct includes a main air duct that guides air to be sucked into an engine and a brake air duct for cooling a brake system.

If a function for maintaining only a temperature of the engine is performed, the engine cannot be properly cooled when the engine needs to be cooled, fuel efficiency is deteriorated in high-speed running, and peripheral parts of a high-temperature exhaust pipe may be thermally damaged.

As heat dissipation members, a condenser, an intercooler, and a radiator are sequentially provided in a front side of the vehicle, and the condenser condenses a coolant to discharge heat to the outside from the coolant, the intercooler discharges heat to the outside from air compressed by a compressor, and the radiator discharges heat to the outside from a coolant circulating the engine.

In consideration of compact packing of the vehicle and the engine layout, narrow spaces are formed between the condenser, the intercooler, and the radiator, and the external air is sequentially passes through the condenser, the intercooler, and the radiator.

For example, when a temperature of the external air passing through the condenser or 45° C., a temperature of the external air passing through the intercooler may reach 65° C., a temperature of the external air passing through the radiator may reach 75° C., and a temperature of air passed through the radiator may be more increased.

As described above, the temperature of the cooling air is increased while passing through the heat dissipation members so that cooling efficiency of the intercooler and the radiator may be deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a structure and a system that can improve the entire cooling efficiency by decreasing a temperature of a cooling air flowing through an intercooler and a radiator.

According to various aspects of the present invention, an air flow control system of a vehicle may include an engine mixing air and fuel and generating a rotation force by combusting the mixture of the air and the fuel in a combustion chamber, main ducts provided in a front side of the vehicle to transmit air to the combustion chamber of the engine, heat dissipation members provided adjacent to the main ducts to cool a fluid flowing inside thereof though heat exchange with external air, assistant ducts branched from the main ducts to transmit air flowing in the main ducts to the heat dissipation members, and control valves provided in the assistant ducts to control air supplied to the heat dissipation members.

The heat dissipation members may include a condenser emitting heat energy from a coolant, an intercooler emitting heat energy from air compressed by a compressor, and a radiator emitting heat energy from a coolant circulating the engine.

The assistant ducts may be provided at lateral sides of a vehicle body respectively to supply external air to a space between the condenser and the intercooler and a space between the intercooler and the radiator.

The main ducts and the assistant ducts may be symmetrically arranged at lateral sides of a vehicle body, and one of the assistant ducts may be provided to transmit air between the intercooler and the radiator and another may be provided to transmit air between the condenser and the radiator.

The air flow control system may include a distance controller provided between the intercooler and the radiator, operated by a difference between a coolant passing through the radiator and air passing through the intercooler to control a distance between the intercooler and the radiator.

The distance controller may be provided at lateral ends between the radiator and the intercooler.

The distance controller may include a shape memory alloy operated by a temperature difference between a coolant passing through the radiator and air passing through the intercooler.

The air flow control system may include a controller sensing engine speed and a load of the engine and controlling the control valves according to states of the speed and the load of the engine.

The controller may open the control valve of the assistant duct connected between the condenser and the intercooler to increase an amount of external air flown into the intercooler when the engine is under high speed and large load condition.

The controller may open the control valve of the assistant duct connected between the intercooler and the radiator to increase an amount of external air flown into the radiator when the engine is under low speed and large load condition.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
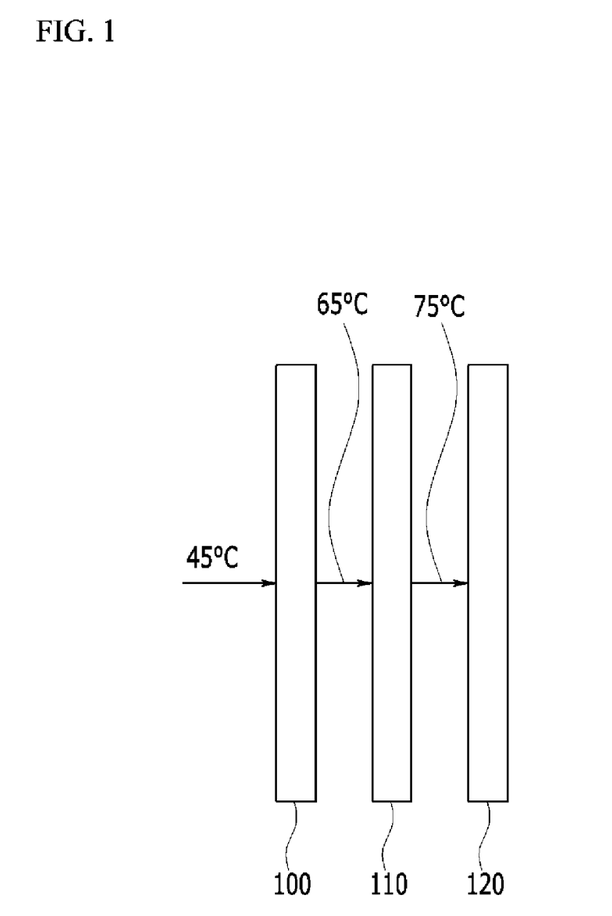
FIG. 1 is a schematic side view of a heat dissipation member provided in a front side of a vehicle.

FIG. 1 is a schematic side view of a heat dissipation member provided in a front side of a vehicle.

Referring to FIG. 1, a heat dissipation member includes a condenser 100, an intercooler 110, and a radiator 120.

A temperature of a cooling air is increased while passing through the heat dissipation member so that cooling efficiency of the intercooler 110 and the radiator 120 may be deteriorated.

Thus, in various embodiments of the present invention, a structure and a system that can improve the entire cooling efficiency by reducing a temperature of the cooling air flowing through the intercooler 110 and the radiator 120 are suggested.

Figure 2:
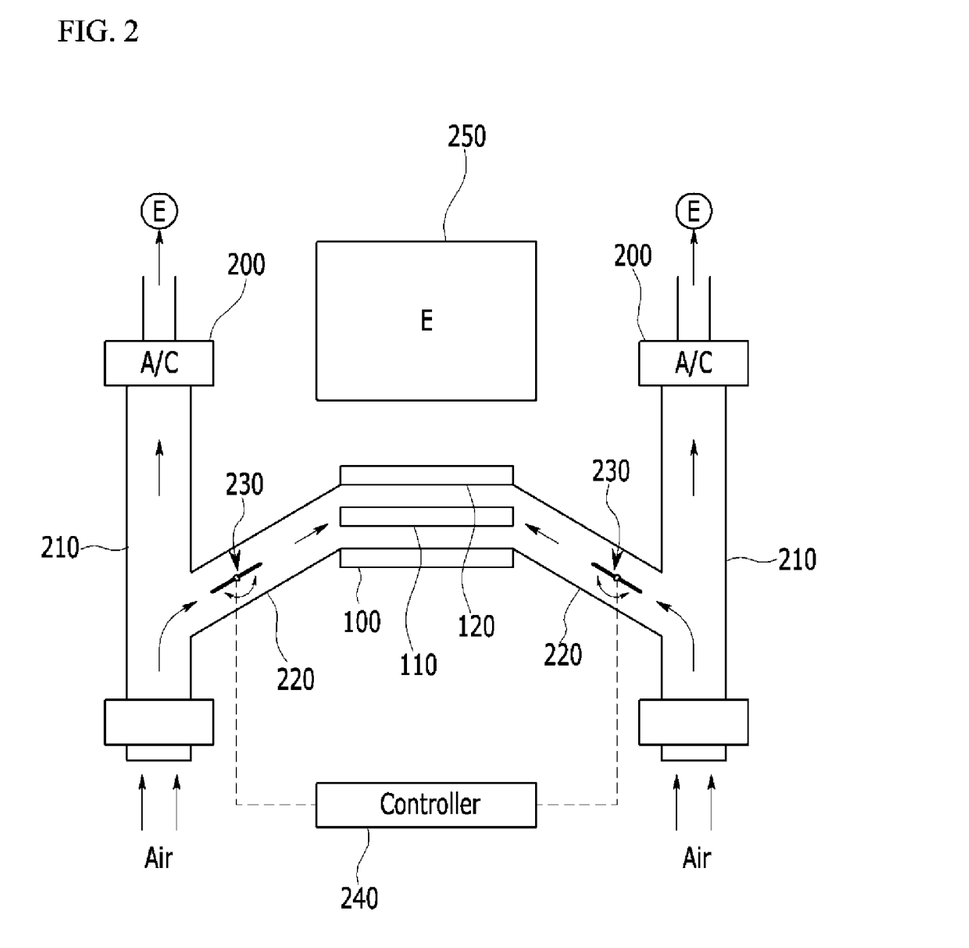
FIG. 2 is a schematic cross-sectional view of an exemplary air flow control system of a vehicle according to the present invention.

FIG. 2 is a schematic cross-sectional view of an air flow control system of a vehicle according to various embodiments of the present invention.

The air flow control system of the vehicle includes a controller 240, an engine 250, main ducts 210, an air cleaner 200, assistant ducts 220, control valves 230, a condenser 100, an intercooler 110, and a radiator 120.

The main ducts 210 are provided at front lateral sides of the vehicle body, and supplies external air to a combustion chamber of the engine 250 through the air cleaner 200.

In addition, the condenser 100, the intercooler 110, and the radiator 120, which are heat dissipation members, are provided in a front center of the vehicle body between the main ducts 210.

The assistant ducts 220 are respectively branched from the main duct 210 and thus connected to a space between the condenser 100 and the intercooler 110 and a space between the intercooler 110 and the radiator 120 such that air flowing through the main ducts 210 are supplied to a space between the heat dissipation members through the assistant ducts 220.

The control valves 230 that control the air flowing to the spaces between the heat dissipation members from the main ducts 210 are provided in the assistant ducts 220.

The control valves 230 are controlled by an additional controller, and an opening rate of the control valve 230 may be arbitrary controlled or controlled to be turned on/turned off according to an operation condition of the engine 250.

In FIG. 2, the assistant ducts 220 may supply the external air to between the condenser 100 and the intercooler 110 and to between the intercooler 110 and the radiator 120. Alternatively, the assistant duct 220 provided in the right side may supply the external air to between the condenser 100 and the intercooler 110 and the assistant duct 220 provided in the left side may supply the external air to between the intercooler 110 and the radiator 120.

Thus, a controller 240 senses engine speed and a load of the engine 250, and opens the control valves 230 of the assistant ducts 220 connected between the condenser 100 and the intercooler 110 under high speed and large load so as to increase the amount of external air flown into the intercooler 110.

In addition, the controller 240 opens the control valve 230 of the assistant duct 220 connected between the intercooler 110 and the radiator 120 under low speed and large load so as to increase the amount of external air flown into the radiator 120.

Figure 3:
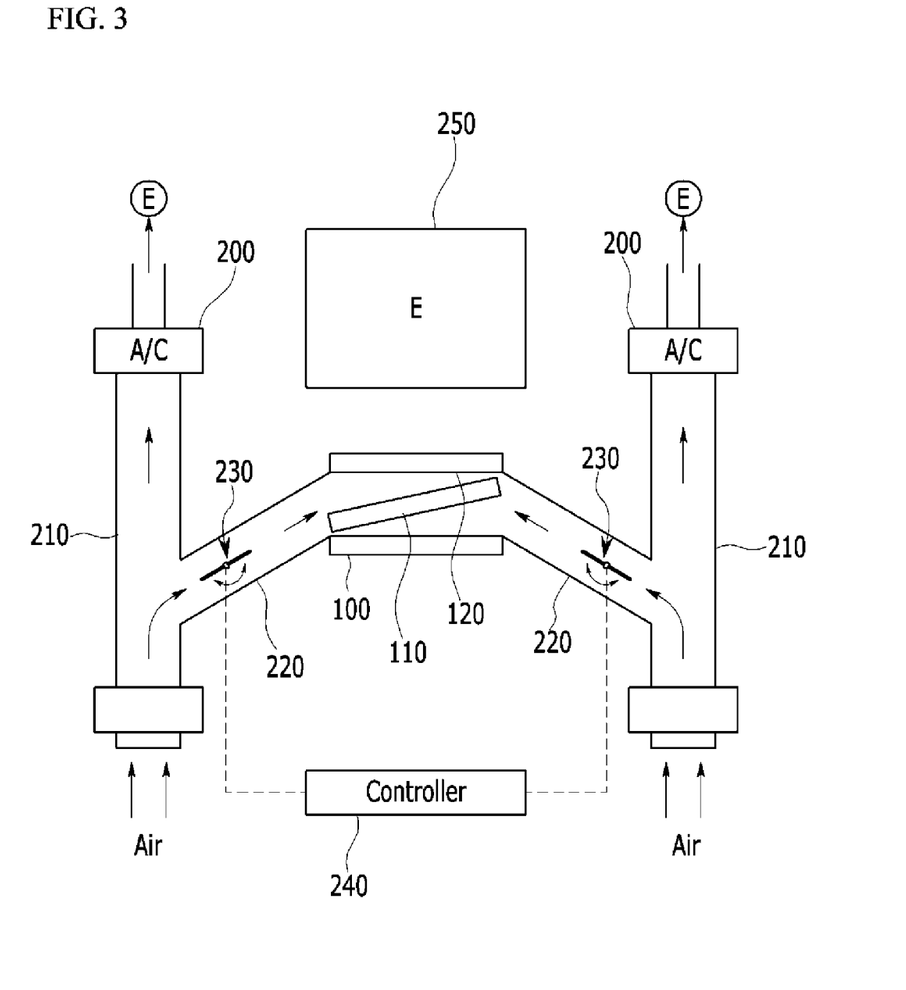
FIG. 3 is a schematic cross-sectional view of an exemplary air flow control system of a vehicle according to the present invention.

FIG. 3 is a schematic cross-sectional view of an air flow control system of a vehicle according to various embodiments of the present invention. The configuration in FIG. 3 which is different from that in FIG. 1 and FIG. 2 is described in detail, while the detailed description of the same or similar configuration is not provided.

Referring to FIG. 3, in the heat dissipation member disposed in the left side of the drawing, the condenser 100 and the radiator 120 are disposed in parallel with a width direction of the vehicle body and the intercooler 110 is inclined while having a predetermined angle with the width direction of the vehicle body.

Thus, a distance between the intercooler 110 and the radiator 120 is varied along the width direction of the vehicle body.

That is, in FIG. 3, a distance between the intercooler 110 and the radiator 120 is gradually decreased from the left side to the right side, and a distance between the intercooler 110 and the condenser 100 is gradually increased from the left side to the right side.

Thus, according to a state of the control valves 230, the assistant duct 220 provided in the left side may mostly supply external air to between the intercooler 110 and the radiator 120 and the assistant duct 220 provided in the right side may mostly supply external air to between the condenser 100 and the intercooler 110.

Figure 4:
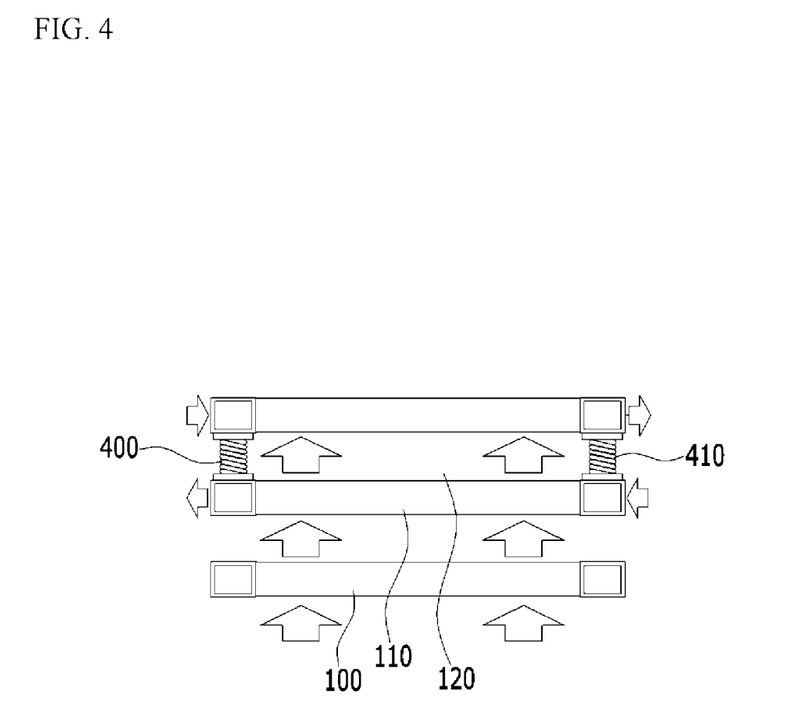
FIG. 4 is a schematic top plan view of an exemplary air flow control system of a vehicle according to the present invention.

FIG. 4 is a schematic top plan view of an air flow control system of a vehicle according to various embodiments of the present invention. The configuration in FIG. 4 which is different from that in FIG. 1 and FIG. 2 is described in detail, while the detailed description of the same or similar configuration is not provided.

Referring to FIG. 4, a first distance controller 400 and a second distance controller 410 are provided between an intercooler 110 and a radiator 120. The first distance controller 400 and the second distance controller are respectively disposed at lateral ends between the intercooler 110 and the radiator 120.

The first distance controller 400 and the second distance controller 410 include a shape memory alloy, and the shape memory alloy is set to contracted or expanded according to a temperature of compressed air flown into the intercooler 110, a temperature of compressed air discharged from the intercooler 110, a temperature of high-temperature coolant flown into the radiator 120, and a temperature of low-temperature coolant discharged from the radiator 120.

For example, the first distance controller 400 may include a shape memory alloy that is expanded when a difference between the temperature of the compressed air discharged from the intercooler 110 and the temperature of the high-temperature coolant flown into the radiator 120 is higher than a predetermined value.

In addition, the second distance controller 410 may include a shape memory alloy that is contracted when a difference between the temperature of the compressed air flown into the intercooler 110 and the temperature of the low-temperature coolant discharged from the radiator 120 is higher than a predetermined value.

Figure 5:
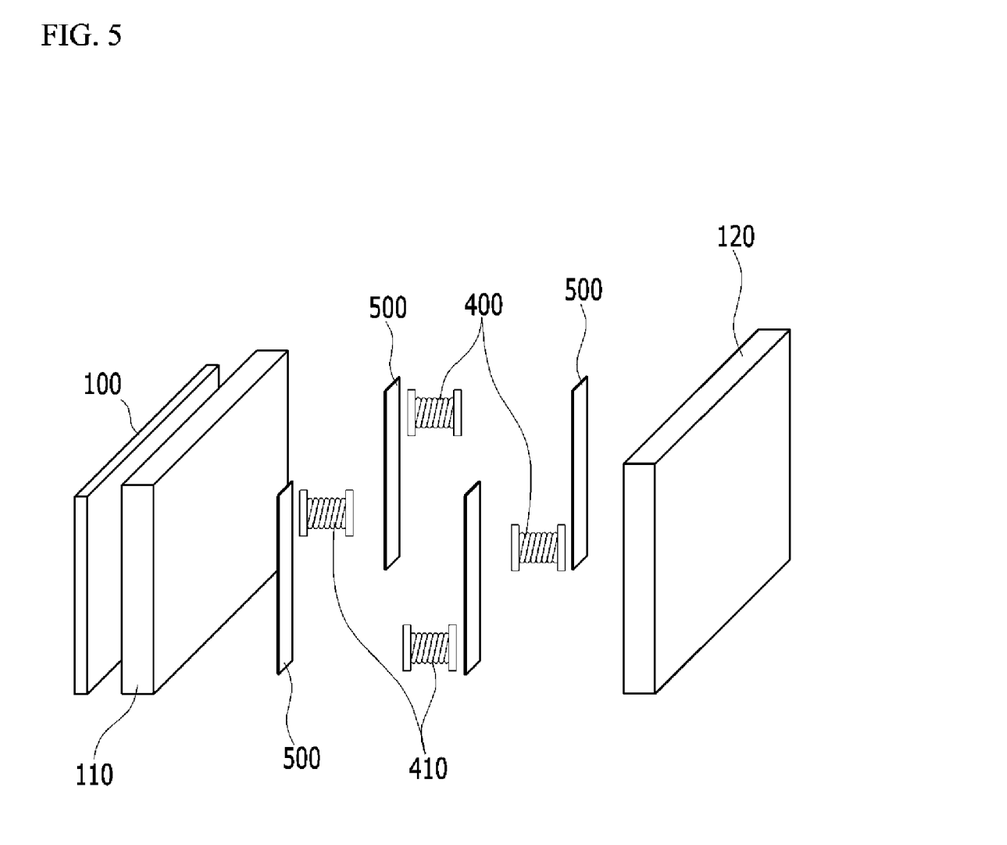
FIG. 5 is a schematic exploded perspective view of FIG. 3.

FIG. 5 is a schematic exploded perspective view of FIG. 3.

Referring to FIG. 5, the air flow control system of the vehicle includes the condenser 100, the intercooler 110, brackets 500, the first distance controller 400, the second distance controller 410, and the radiator 120.

The bracket 500 are respectively provided from an upper portion to a lower portion at lateral ends of a rear surface of the intercooler 110, and the brackets 500 are respectively provided from an upper portion to a lower portion at lateral ends of a front surface of the radiator 120.

As shown in the drawing, four brackets 500 are respectively provided in the upper and lower portions in the first and second distance controllers 400 and 500. In various embodiments of the present invention, the number of brackets 500 and the locations of the brackets 500 may be changed according to a design specification.

Figure 6:
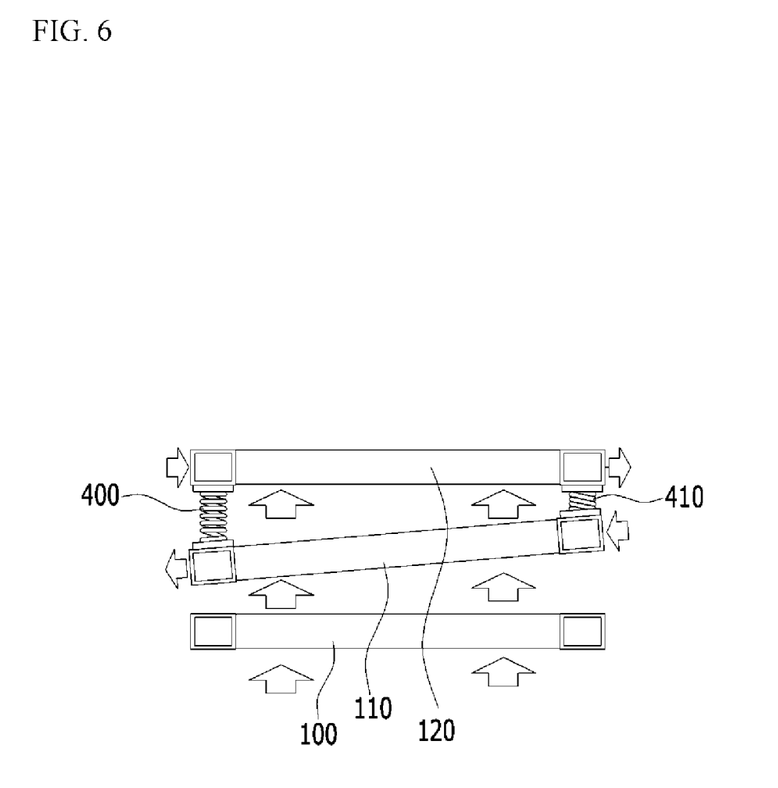
FIG. 6 is a top plan view illustrating an operation state of the exemplary air flow control system of the vehicle of FIG. 4 according to the present invention.

FIG. 6 is a top plan view illustrating an operation state of the air flow control system of the vehicle according to various embodiments of the present invention. The configuration in FIG. 6 which is different from that in FIG. 1 to FIG. 5 is described in detail, while the detailed description of the same or similar configuration is not provided.

Referring to FIG. 6, when a difference between a temperature of a high-temperature coolant flown into a radiator 120 and a temperature of a low-temperature compressed air discharged from the intercooler 110 is higher than a predetermined value, a shape memory alloy of a first distance controller 400 is expanded.

In addition, when a difference between a temperature of a low-temperature coolant discharged from the radiator 120 and a temperature of high-temperature compressed air flown into the intercooler 110 is higher than a predetermined value, a shape memory alloy of a second distance controller 410 is contracted.

Thus, external air is additionally supplied to between the intercooler 110 and the radiator 120, and the external air is additionally supplied to between the condenser 100 and the intercooler 110.

Figure 7:
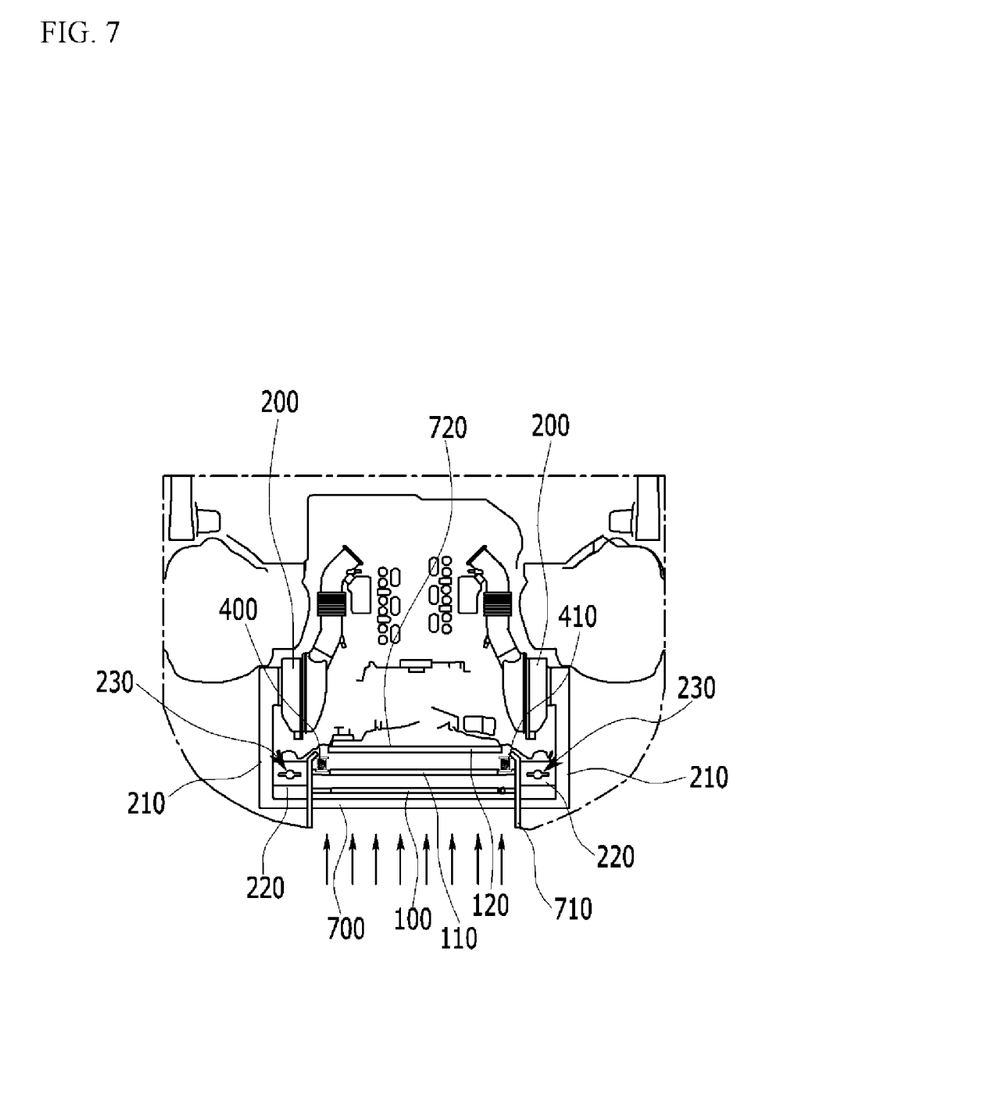
FIG. 7 is an entire top plan view of an exemplary air flow control system of a vehicle according to the present invention.

FIG. 7 is an entire top plan view of an air flow control system of a vehicle according to various embodiments of the present invention. The configuration in FIG. 6 which is different from that in FIG. 1 to FIG. 6 is described in detail, while the detailed description of the same or similar configuration is not provided.

Referring to FIG. 7, an active air flap (AAF) 700 is applied to a front side of a condenser 100, and external air passed through the AAF 700 through a guide duct 710 provided in the front side passes through a fan 720 through the condenser 100, an intercooler 110, and a radiator 120.

In addition, external air is flown into main ducts 210 provided at lateral sides of the vehicle body by the guide duct 710 at a peripheral area of the AAF 700.

The external air supplied to the main ducts 210 is supplied to a combustion chamber of an engine through an air cleaner 200. In addition, cooling efficiency of the condenser 100, the intercooler 110, and the radiator 120 is effectively controlled by operations of control valves 230, a first distance controller 400, and a second distance controller 410 provided in assistant ducts 220.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air flow control system of a vehicle, comprising:
   an engine mixing air and fuel and generating a rotation force by combusting the mixture of the air and the fuel in a combustion chamber of the engine;
   main ducts provided in a front side of the vehicle to transmit air to the combustion chamber of the engine;
   heat dissipation members configured to cool a fluid flowing inside thereof through heat exchange with external air wherein the heat dissipation members are provided adjacent to the main ducts;
   assistant ducts branched from the main ducts to transmit air flowing in the main ducts to an external surface of the heat dissipation members;
   control valves provided in the assistant ducts to control air supplied to the heat dissipation members; and
   a controller sensing engine speed and a load of the engine and controlling the control valves according to states of the speed and the load of the engine.

2. The air flow control system of the vehicle of claim 1, wherein the heat dissipation members comprise:
   a condenser emitting heat energy from a coolant;

an intercooler emitting heat energy from air compressed by a compressor; and
a radiator emitting heat energy from a coolant circulating the engine.

3. The air flow control system of the vehicle of claim 2, wherein the assistant ducts are provided at lateral sides of a vehicle body respectively to supply external air to a space between the condenser and the intercooler and a space between the intercooler and the radiator.

4. The air flow control system of the vehicle of claim 2, wherein the main ducts and the assistant ducts are symmetrically arranged at lateral sides of a vehicle body, and one of the assistant ducts is provided to transmit air between the intercooler and the radiator and another is provided to transmit air between the condenser and the radiator.

5. The air flow control system of the vehicle of claim 4, comprising a distance controller provided between the intercooler and the radiator, operated by a difference between a coolant passing through the radiator and air passing through the intercooler to control a distance between the intercooler and the radiator.

6. The air flow control system of the vehicle of claim 5, wherein the distance controller is provided at lateral ends between the radiator and the intercooler.

7. The air flow control system of the vehicle of claim 5, wherein the distance controller comprises a shape memory alloy operated by a temperature difference between a coolant passing through the radiator and air passing through the intercooler.

8. The air flow control system of the vehicle of claim 1, wherein the controller opens the control valve of the assistant duct connected between the condenser and the intercooler to increase an amount of external air flown into the intercooler when the engine is under high speed and large load condition.

9. The air flow control system of the vehicle of claim 1, wherein the controller opens the control valve of the assistant duct connected between the intercooler and the radiator to increase an amount of external air flown into the radiator when the engine is under low speed and large load condition.

* * * * *